United States Patent
Ransom et al.

(10) Patent No.: US 7,246,630 B1
(45) Date of Patent: Jul. 24, 2007

(54) TREE STAND HUNTING BLIND

(76) Inventors: Robert M. Ransom, 8102 Coldwater Rd., Flushing, MI (US) 48433; Scott D. Wehner, 4407 W. Stanley Rd., Mt. Morris, MI (US) 48458; Ryan L. Kubica, 8470 Apple Blossom, Flushing, MI (US) 48433

( * ) Notice: Subject to any disclaimer, the term of this patent is extended or adjusted under 35 U.S.C. 154(b) by 327 days.

(21) Appl. No.: 10/830,502

(22) Filed: Apr. 23, 2004

Related U.S. Application Data

(60) Provisional application No. 60/470,907, filed on May 15, 2003.

(51) Int. Cl.
*E04H 15/04* (2006.01)

(52) U.S. Cl. .................. 135/90; 135/126; 135/117; 135/901; 182/187; 43/1

(58) Field of Classification Search .............. 135/90, 135/121, 126, 143, 115, 120.1, 907, 128, 135/117, 901; 182/187–188, 116, 133–135; 43/1
See application file for complete search history.

(56) References Cited

U.S. PATENT DOCUMENTS

| | | | | |
|---|---|---|---|---|
| 3,116,808 A | * | 1/1964 | Riley ........................ 182/129 |
| 3,358,789 A | * | 12/1967 | Laun ......................... 182/187 |
| 3,442,275 A | * | 5/1969 | Ternes ........................ 135/90 |
| 4,815,784 A | * | 3/1989 | Zheng ...................... 296/97.7 |
| 4,825,578 A | * | 5/1989 | Robinson ........................ 43/1 |
| 4,951,696 A | | 8/1990 | Jones, Sr. |
| 5,218,982 A | | 6/1993 | Kenji |
| 5,411,046 A | * | 5/1995 | Wan ........................... 135/126 |
| 5,430,980 A | * | 7/1995 | Ferrier ....................... 135/126 |
| 5,528,849 A | | 6/1996 | Plinta |
| 5,592,961 A | * | 1/1997 | Chin .......................... 135/125 |
| 5,613,512 A | | 3/1997 | Bean |
| 5,632,318 A | * | 5/1997 | Wang .................... 160/370.21 |
| 5,653,309 A | * | 8/1997 | Sturm ........................ 182/187 |
| 5,762,085 A | * | 6/1998 | Punch ........................ 135/115 |
| 5,975,101 A | * | 11/1999 | Zheng ........................ 135/125 |
| 6,243,979 B1 | * | 6/2001 | Seats et al. ..................... 42/94 |
| 6,257,263 B1 | * | 7/2001 | Brereton ..................... 135/126 |
| 6,305,396 B1 | * | 10/2001 | Zheng ........................ 135/126 |
| 6,499,496 B1 | * | 12/2002 | Young .......................... 135/90 |
| 6,510,922 B1 | * | 1/2003 | Hodnett ...................... 182/187 |
| 6,588,440 B2 | * | 7/2003 | Varnado ....................... 135/90 |
| 6,672,322 B1 | * | 1/2004 | Littlefield .................... 135/90 |
| 6,823,882 B1 | * | 11/2004 | Innes .......................... 135/90 |
| 7,040,333 B1 | * | 5/2006 | Ransom et al. ............. 135/126 |
| 2002/0069904 A1 | * | 6/2002 | Robinson ..................... 135/87 |
| 2003/0024559 A1 | * | 2/2003 | Fields ......................... 135/90 |

FOREIGN PATENT DOCUMENTS

CA 2209806 A1 * 1/1999

* cited by examiner

*Primary Examiner*—Winnie Yip
(74) *Attorney, Agent, or Firm*—Young Basile

(57) ABSTRACT

A preassembled, collapsible tree stand hunting blind which folds into a compact package, utilizing coilable steel frame members which may be collapsed. The enclosure is adapted to be attached to the trunk of the tree and to an associated platform, such as a hunter's tree stand. The enclosure is provided with camouflage elements to render the user relatively invisible to game in the surrounding environment.

9 Claims, 5 Drawing Sheets

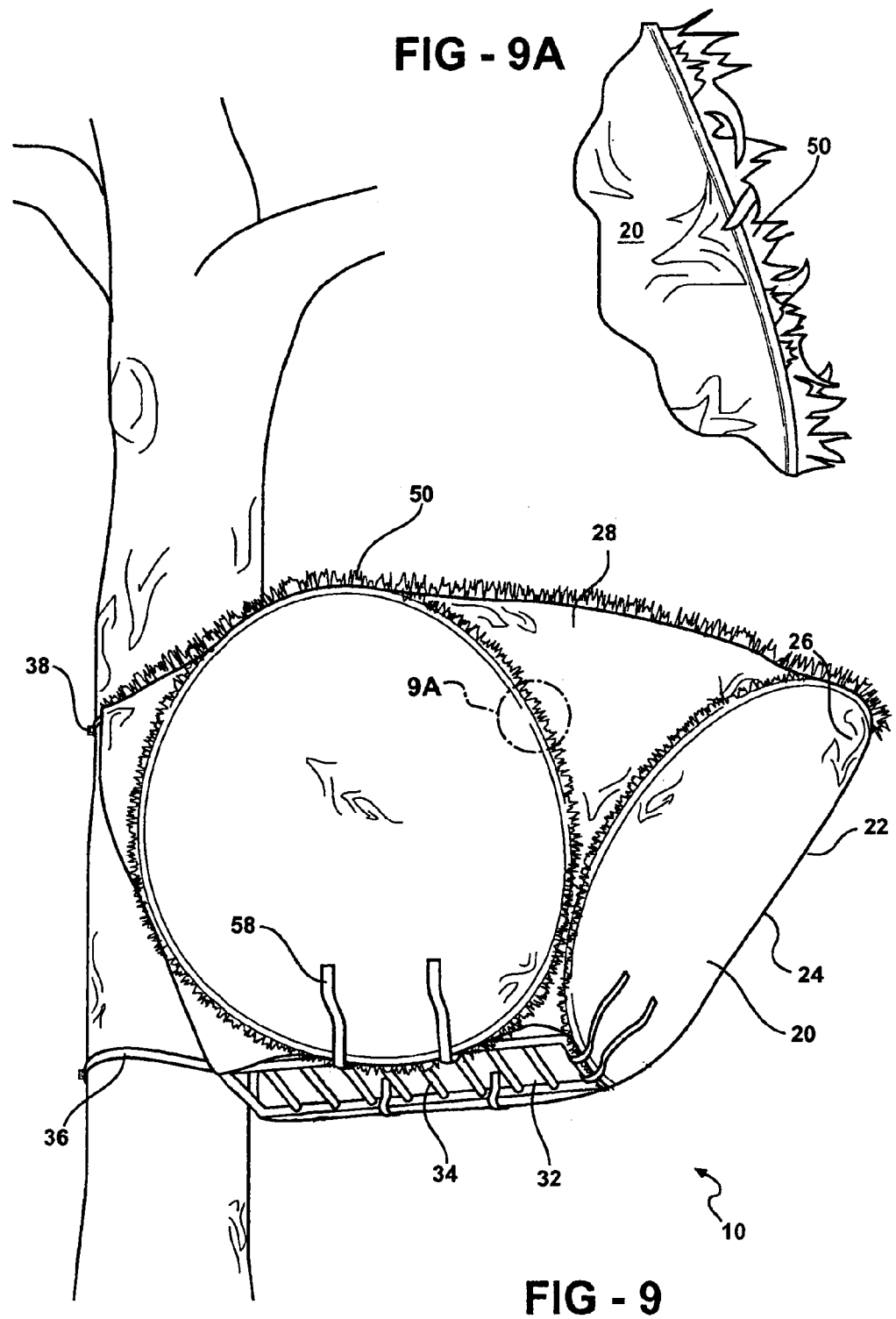

TREE STAND HUNTING BLIND

PRIORITY CLAIM

This invention claims priority under Provisional Patent Application Ser. No. 60/470,907, filed May 15, 2003.

FIELD OF THE INVENTION

This invention pertains to devices for concealing observers and hunters from game animals, and more particularly, such devices which are adapted to affixation to a tree or pole and used from an elevated position.

BACKGROUND OF THE INVENTION

Hunters frequently utilize elevated seats or platforms, known as tree stands, as a vantage point from which to observe and to hunt wild game. Such platforms provide a suitable temporary observation station in which the hunter may be comfortably concealed from his surrounding environment. Because a hunter may occupy a tree stand for a long period of time in hard-to-access locations, and because of the patience required for a successful hunt of many species of game, it is preferable that tree stands be comfortable, roomy, well camouflaged and portable.

Tree stands have traditionally incorporated a number of collapsible features enabling them to be carried in a relatively compact package, yet quickly and easily erected to form a suitable enclosure and blind. A typical early effort found in U.S. Pat. No. 4,951,696, issued to Jones, features a pair of foldable grid work elements supported by a frame to which a camouflage material may be attached. This device, however, required a substantial number of assembly and disassembly steps, and even when folded, the Jones hunting stand is only as small as the smallest of the platform elements from which the unit was comprised. Similar limitations are present in U.S. Pat. No. 5,218,982, issued to Kenji. This tent-like tree-mounted hunting blind requires a complex collection of articulated components, and though collapsible, presents a collapsed volume at least as large as one of the several seating plates which form the base of the unit.

In U.S. Pat. No. 5,613,512, Bean discloses a foldable hunting blind for tree-mounted use incorporating, like the prior art, a complex collection of frame elements which accordingly dictates equally complex assembly.

A better effort at solving the problem of the volume of the folded tree stand was made by Plinta, as shown in U.S. Pat. No. 5,528,849, which utilizes a plurality of hoops to provide shape and rigidity to what is essentially a cylindrical blind, which may be collapsed, but only into a package as small as the circumference of the hoop-like frame elements.

These and other structures all suffer from the limitations that assembly and disassembly is either too complex or the resulting folded blind occupies too large a volume to be conveniently packed into the hunting area from a remote location. Likewise, most of the prior art structures are excessively heavy and expensive.

SUMMARY OF THE INVENTION

The present invention is a pre-assembled collapsible tree stand hunting blind which folds into an exceedingly compact package by virtue of the utilization of coilable steel frame members which may be collapsed into a package having a diameter roughly one-third of the diameter of the frame members when expanded.

The tree stand hunting blind includes at least three collapsible panels, which, when erected, are roughly circular in shape, and which are joined together with filler panels, to form a substantially multi-sided enclosure. The enclosure is likewise adapted to be affixed to the trunk of the tree and attached to a rigid tree stand. Preferably, the enclosure is provided with camouflage elements to render the user relatively invisible to game in the surrounding environment. The enclosure is open at the top to permit the user to sit or stand and to project a weapon above the upper edge of the enclosure. The enclosure is provided with openings in the bottom to allow the occupant to sit within the enclosure and, if required, to extend his or her legs through the bottom of the enclosure.

In a second embodiment of the invention, the framework which surrounds the enclosure, as well as the edges of the enclosure itself, are fitted with a 3-dimensional appearing fringe or applique tending to simulate the outlines of foliage.

DETAILED DESCRIPTION OF THE DRAWINGS

FIG. 9 is a perspective view of a second embodiment of the invention.

FIG. 9A is a detailed view of a section of FIG. 9.

DESCRIPTION OF THE PREFERRED EMBODIMENT

Figure 1:
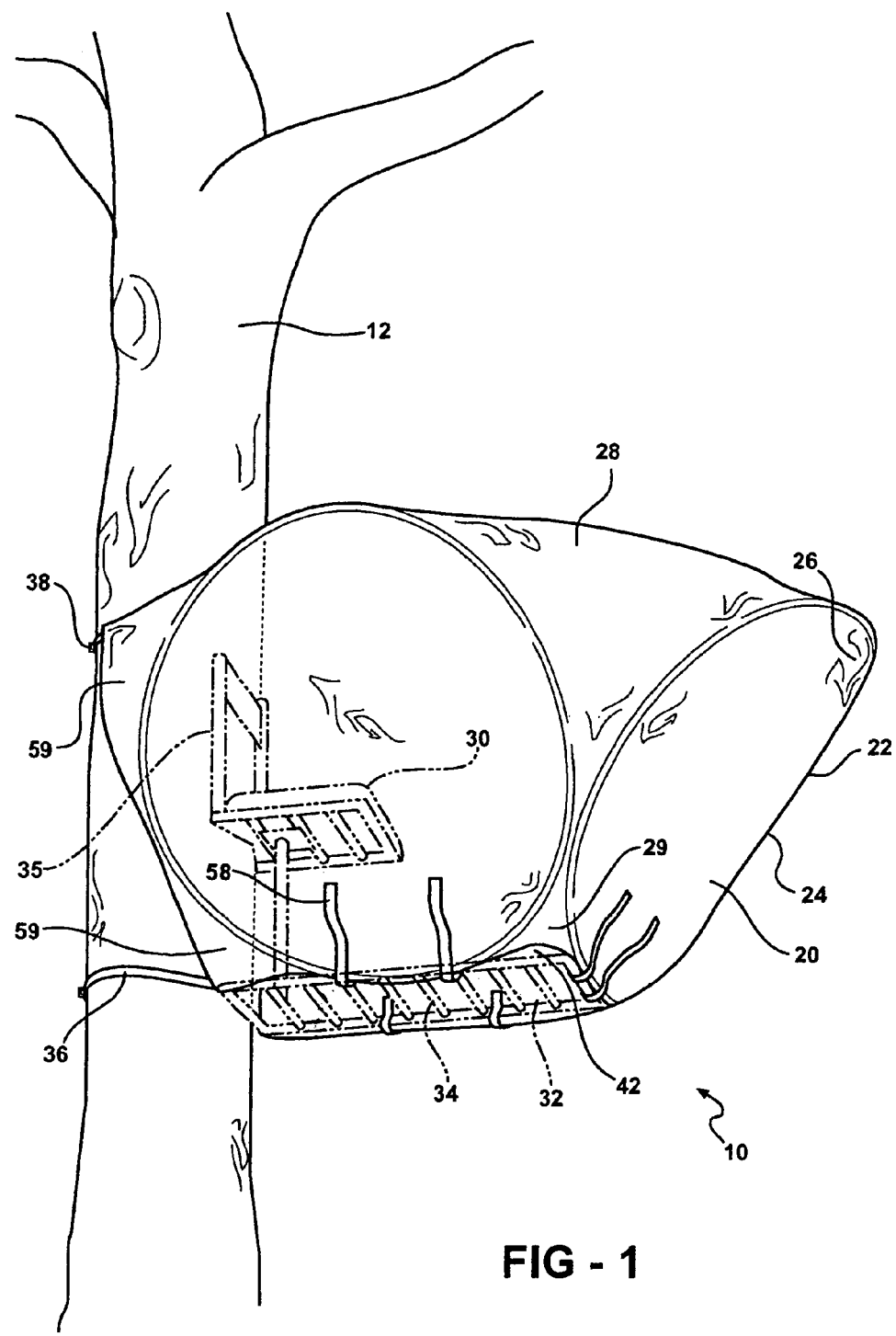
FIG. 1 is a perspective view of the invention as mounted in the typical environment.

The invention will be best understood first by reference to FIG. 1. The invention is a hunting blind 10 attachable to a seat assembly 32 and is in the form of a multi-sided enclosure comprised of a plurality of panels 20. Each panel 20 has an integral frame 24 defining a perimeter 22 which is generally circular in shape when the blind 10 is erected. In one embodiment, each of the panels 20 is preferably imprinted with a camouflage pattern 26, and may further be provided with cutout elements which provide a 3-dimensional appearance to the panels 20 as will be later described. Sides of adjoining panels 20 are affixed together proximate a point on the perimeter 22 of adjoining panels 20. This attachment creates a substantially multi-sided enclosure. The panels 20 are principally comprised of a flexible material such as natural or synthetic fabric, and the camouflage pattern 26 is selected to enhance the blending of the erected blind 10 into the surrounding environment in which it is intended to be used. The integral frame 24 within each panel 20 is constructed preferably of spring steel, which is desirable for its ability to be coiled and uncoiled.

Each of the panels 20 is constructed so as to be collapsible in a manner to be described further herein.

The panels 20 are further interconnected by filler panels 28 and 29 located near the top and the bottom of the blind, respectively. Filler panels 28 and 29 are preferably of fabric material identical to that used for the side panels 20, and may be provided with a stiffener support (not shown).

The process of folding the hunting blind is depicted in FIGS. 3-6. It is by virtue of this folding process that the enclosure may be collapsed into an extremely compact package for transport.

Figure 4:
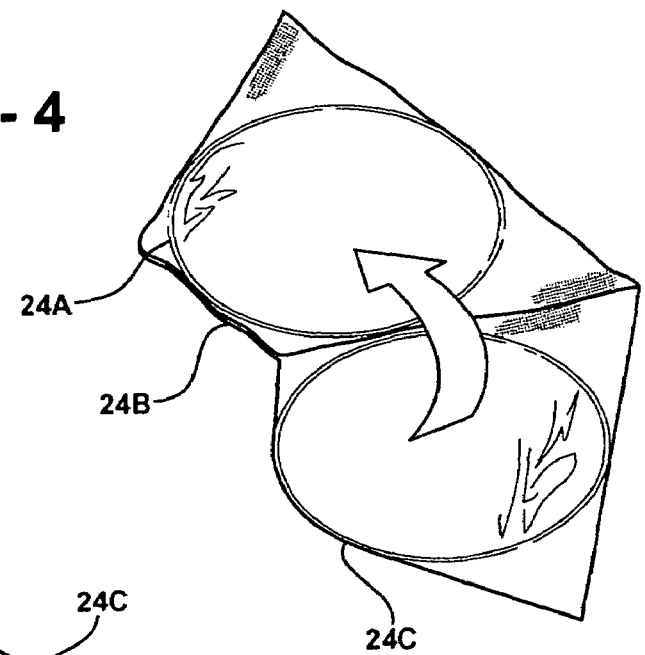
Figure 5:
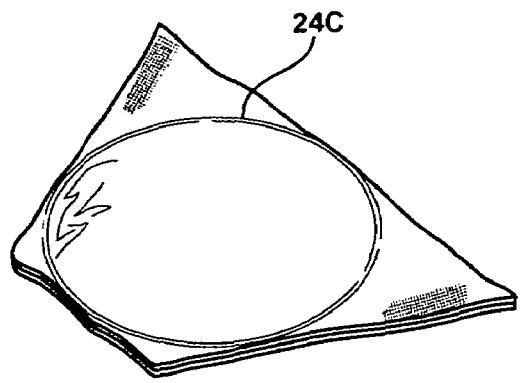
Figure 6:
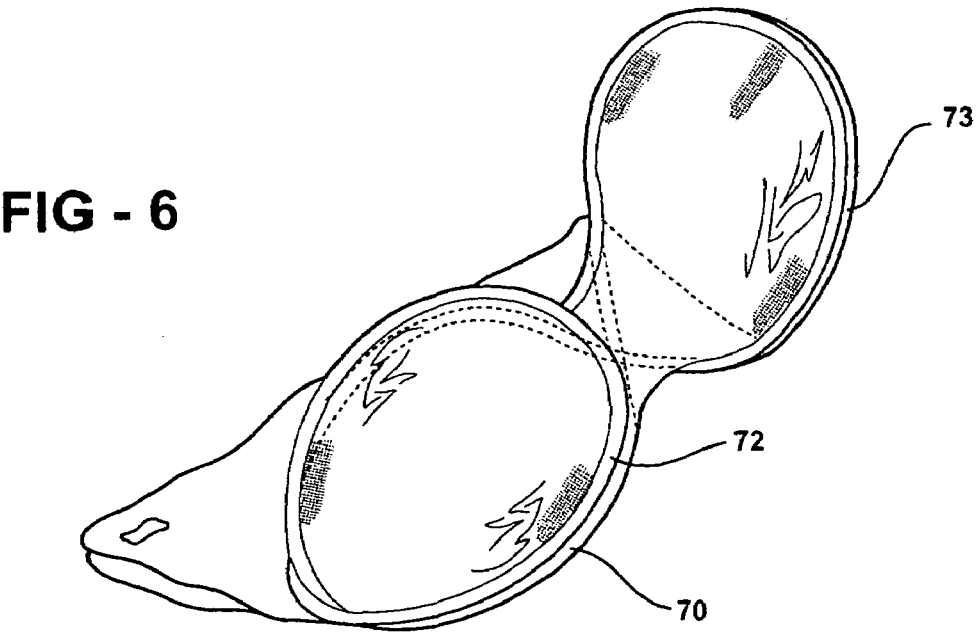

As shown in FIGS. 4 and 5, the folding process begins by superimposing the panels 20 and their respective frame elements 24A-24C in a stacked fashion. One edge of the stacked panels is then folded inward, resulting in the creation of three loops 70, 72 and 73 as shown in FIG. 6. The properties of the spring steel are such that the creation of these three loops is the natural response of the steel when folded as above-described. The three loops, 70, 72 and 73 can then be superimposed as shown in FIG. 6. Each completed loop 70, 72 and 73 is roughly one-third the diameter of the extended diameter of each frame member 24.

Figure 7:
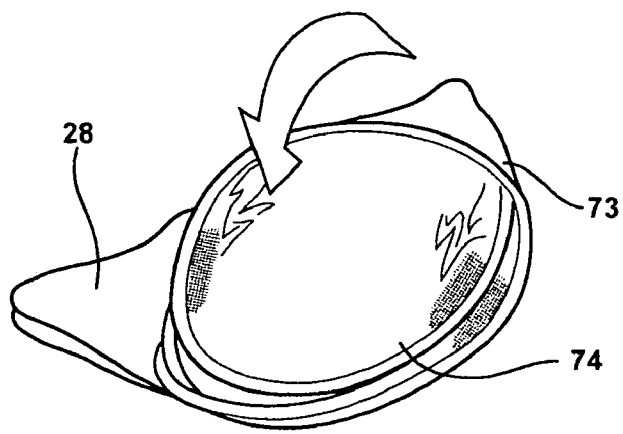
Figure 8:
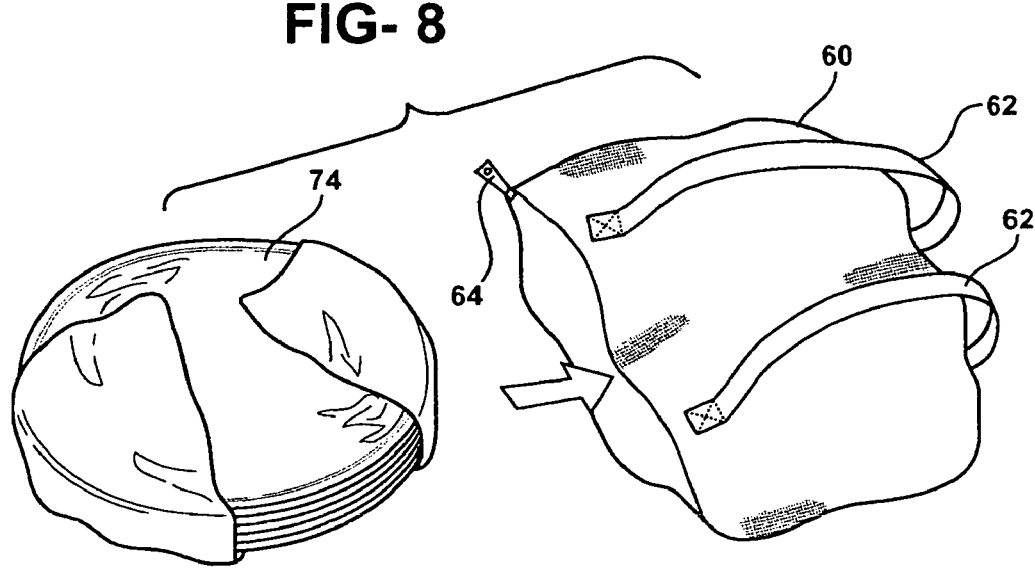
FIG. 8 is a view of the collapsed enclosure shown in relation to its carrying bag.

Once the folding process is completed as shown in FIG. 7, the loose fabric material from the filler panels 28 and 29 may be folded over the coiled loops as shown in FIG. 8 and inserted into a closable container 60 having carrying straps 62 and closure 64.

Figure 2:
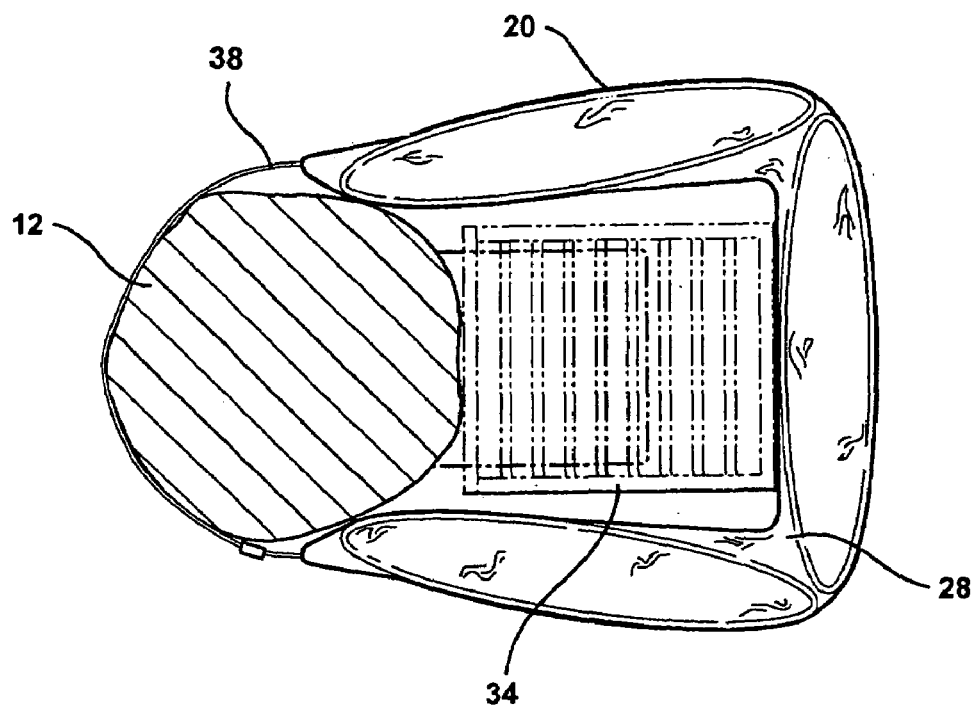
FIG. 2 is a top view of the invention as erected.
Figure 3:
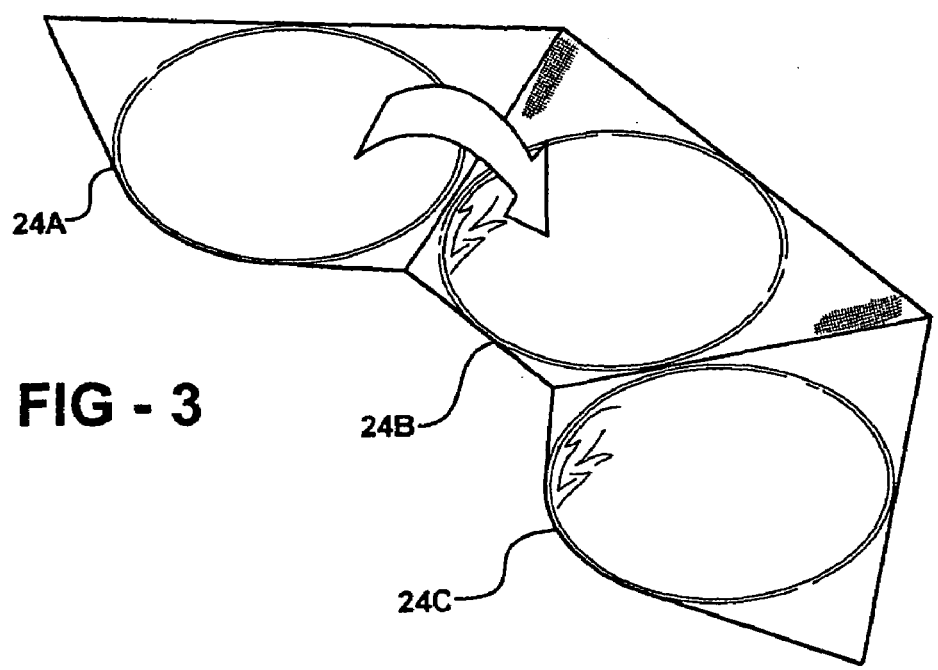
FIGS. 3-7 are a series of drawings showing the folding process for the enclosure.

As shown in FIGS. 1 and 2, the multi-sided enclosure thus described is adapted to be affixed adjacent to a seat assembly 32 consisting of a seat 30, a seat back 35 and a foot rest 34, which are affixed to a tree 12 in a well known fashion, so that when installed provide a seat 30 and parallel foot rest 34 to create a comfortable seating position for the user of the blind. The seat 30 and foot rest 34 are typically affixed to a tree 12 using straps and gripper elements (not shown) which frictionally engage the circumference of the tree 12.

Each panel 20 is provided with means for attachment such as straps 58 adapted to secure the bottom of the panels 20 to the seat assembly 32, and further provided second attachment means such as straps 38 and 36 adapted to attach filler panels 59 associated with the sides of panels 20 to the trunk of the tree. Filler panels 59 are provided to extend from the upper rear section of panels 20 to engage the tree 12, thereby further enhancing the completeness of the enclosure and effectively surrounding the occupant to provide security from observation, as well as protection from the elements.

Filler panels 29 are provided with a relieved section 42 where they pass near the forward corners of seat 34, thereby allowing the occupant to extend his or her legs through the bottom of the enclosure 10 when seated.

In a second embodiment of my invention, as shown in FIG. 9 and FIG. 9A, a 3-dimensional effect is achieved by the application of a fringe element 50 to the perimeter 22 of the panels 20 and the perimeter of the panels 28 and 59. This fringe-like 3-dimensional element serves to break up the otherwise stark profile of the enclosure 10 and results in the enclosure 10 being more readily blended into the surrounding environment, by simulating nearby foliage. Because the fringe element 50 is flexible fabric, it is likewise readily collapsible, foldable and portable as above-described.

The fringe element 50 is preferably of a fabric material having a camouflage pattern complimentary or identical to the camouflage pattern 26 of panels 20. This fabric material is lightweight and flexible and may be permanently or removably affixed to the perimeter 22 of the panels 20 of the exterior of enclosure 10. The fringe element 50 may be configured to simulate the appearance of leaves, or may be configured with other geometric shapes such as triangles, circles or squares.

We claim:

1. A portable enclosure adapted for attachment to a tree trunk, comprising:
    a tree supported seat assembly having a substantially planar base;
    a plurality of interconnected side panels, each of said plurality of interconnected side panels comprising a flexible material bounded by a perimeter, and each of said plurality of side panels further comprising a coilable, flexible frame member attached to each said perimeter of each said side panels, and each of said plurality of side panels having an attachment member connected to said substantially planar base of said tree-supported seat assembly for removably securing said plurality of interconnected panels to said tree-supported seat assembly, wherein each said side panel extends upwardly from said substantially planar base of said tree supported seat assembly.

2. The portable enclosure of claim 1, further comprising attachment means for removably securing said enclosure to said tree trunk.

3. A portable enclosure adapted for attachment to a tree trunk, comprising:
    a tree supported seat assembly having a substantially planar base;
    a plurality of interconnected side panels, each of said plurality of interconnected side panels comprising of flexible material bounded by a perimeter, and each of said plurality of side panels further comprising a coilable, flexible frame member attached to each said perimeter of each said side panels, a plurality of filler panels interconnecting each of said plurality of side panels;
    a first attachment member for removably securing said plurality of interconnected panels to said tree trunk; and
    a plurality of second attachment members removably securing said plurality of interconnected panels to said substantially planar base of said tree-supported seat assembly, wherein each said side panel extends upwardly from said substantially planar base of said tree supported seat assembly.

4. A portable enclosure adapted for attachment to a tree trunk, comprising:
    a tree supported seat assembly having a substantially planar base;
    at least three side panels interconnected to define a multi-sided enclosure having an open top, wherein adjacent pairs of said at least three side panels extend substantially perpendicular to one another;
    each said side panel bounded by a perimeter defined by a collapsible, coilable frame element; and
    each said side panel having a first attachment member supportably connecting each said side panel to said substantially planar base of said seat assembly, wherein each said side panel extends upwardly from said substantially planar base of said tree supported seat assembly.

5. The portable enclosure stated in claim 4, further comprising:
    a plurality of filler panels attached to said plurality of side panels for interconnecting said side panels.

6. The portable enclosure stated in claim 5, further comprising:
    at least two of said plurality of filler panels each having a free end for engagement with said tree trunk.

7. The portable enclosure stated in claim 6, further comprising:
    at least one second attachment member extending between said free ends of said at least two filler panels of said plurality of said filler panels for attaching said at least two filler panels to said tree trunk.

8. The portable enclosure stated in claim 4, further comprising:
    adjoining panels of said plurality of side panels are affixed together proximate a point on said perimeter of each said adjoining panel.

9. The portable enclosure stated in claim 4, further comprising:
    each said perimeter is generally circular.

* * * * *